(12) United States Patent
Wu et al.

(10) Patent No.: US 11,122,307 B2
(45) Date of Patent: Sep. 14, 2021

(54) DATA LIVE STREAMING METHOD, AND RELATED DEVICE AND SYSTEM

(71) Applicant: TENCENT TECHNOLOGY (SHENZHEN) COMPANY LTD, Shenzhen (CN)

(72) Inventors: Shuang Wu, Guangdong (CN); Bin Wu, Guangdong (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 124 days.

(21) Appl. No.: 16/438,701

(22) Filed: Jun. 12, 2019

(65) Prior Publication Data

US 2019/0297360 A1    Sep. 26, 2019

Related U.S. Application Data

(63) Continuation of application No. PCT/CN2018/082909, filed on Apr. 13, 2018.

(30) Foreign Application Priority Data

Apr. 18, 2017   (CN) .......................... 201710255354.4

(51) Int. Cl.
*H04N 7/173*   (2011.01)
*H04N 21/2385*   (2011.01)
(Continued)

(52) U.S. Cl.
CPC ..... *H04N 21/2385* (2013.01); *H04N 21/2401* (2013.01); *H04N 21/4126* (2013.01);
(Continued)

(58) Field of Classification Search
CPC ........... H04N 21/2385; H04N 21/4788; H04N 21/475; H04N 21/2401; H04N 21/4126;
(Continued)

(56) References Cited

U.S. PATENT DOCUMENTS 9,266,017 B1*  2/2016  Parker ................... A63F 13/355
9,420,232 B2*  8/2016  Abkairov ................ H04L 65/60
(Continued)

FOREIGN PATENT DOCUMENTS

CN   102647398 A   8/2012
CN   103083904 A   5/2013
(Continued)

OTHER PUBLICATIONS

Office Action for corresponding CN 201710255354.4, dated Mar. 6, 2019.
(Continued)

*Primary Examiner* — Jefferey F Harold
*Assistant Examiner* — Sahar Aqil Riaz
(74) *Attorney, Agent, or Firm* — Sughrue Mion, PLLC

(57) ABSTRACT

A data live streaming method is provided. The data live streaming method includes: receiving, by at least one processor, frame data from clients in a client set, wherein each client in the client set is synchronously running a target application; broadcasting, by the at least one processor, the frame data to each client in the client set to perform data exchange; and synchronously sending, by the at least one processor, the frame data to a mobile terminal, wherein the mobile terminal generates live streaming data corresponding to the target application according to the frame data and prestored data corresponding to the target application.

17 Claims, 10 Drawing Sheets

(51) Int. Cl.

| | | |
|---|---|---|
| *H04N 21/24* | (2011.01) | |
| *H04N 21/41* | (2011.01) | |
| *H04N 21/4402* | (2011.01) | |
| *H04N 21/478* | (2011.01) | |
| *H04N 21/81* | (2011.01) | |
| *H04N 21/4788* | (2011.01) | |
| *H04N 21/475* | (2011.01) | |

(52) U.S. Cl.
CPC ....... *H04N 21/4402* (2013.01); *H04N 21/475* (2013.01); *H04N 21/4781* (2013.01); *H04N 21/4788* (2013.01); *H04N 21/816* (2013.01)

(58) Field of Classification Search
CPC ........... H04N 21/4402; H04N 21/4781; H04N 21/816; H04N 21/41407; H04N 21/2187; A63F 13/355
USPC .......................................................... 725/95
See application file for complete search history.

(56) References Cited

U.S. PATENT DOCUMENTS

| | | | | |
|---|---|---|---|---|
| 9,942,622 | B2* | 4/2018 | Zhang | H04N 21/8547 |
| 10,112,110 | B1* | 10/2018 | Garavito | A63F 13/35 |
| 10,200,768 | B2* | 2/2019 | Niemeyer | H04N 21/8545 |
| 2009/0119729 | A1* | 5/2009 | Periman | H04L 65/4076 |
| | | | | 725/114 |
| 2011/0105226 | A1* | 5/2011 | Perlman | H04L 67/42 |
| | | | | 463/30 |
| 2014/0080592 | A1* | 3/2014 | Shuster | G06Q 10/00 |
| | | | | 463/29 |
| 2014/0092254 | A1* | 4/2014 | Mughal | H04N 21/234381 |
| | | | | 348/158 |
| 2014/0235348 | A1* | 8/2014 | Liang | G01P 15/18 |
| | | | | 463/36 |
| 2015/0018094 | A1* | 1/2015 | Watari | A63F 13/352 |
| | | | | 463/31 |
| 2017/0278291 | A1* | 9/2017 | Young | G06F 8/38 |
| 2017/0348598 | A1* | 12/2017 | Ito | A63F 13/92 |
| 2017/0366591 | A1* | 12/2017 | Thomas | H04N 21/2365 |
| 2018/0221775 | A1* | 8/2018 | Perlman | A63F 13/335 |
| 2018/0240267 | A1* | 8/2018 | Smith | G06T 15/005 |
| 2019/0208284 | A1* | 7/2019 | Guo | H04N 21/8173 |
| 2020/0260149 | A1* | 8/2020 | Ding | H04N 21/2187 |

FOREIGN PATENT DOCUMENTS

| | | |
|---|---|---|
| CN | 105306468 A | 2/2016 |
| CN | 106034129 A | 10/2016 |
| CN | 106210753 A | 12/2016 |
| CN | 106993200 A | 7/2017 |

OTHER PUBLICATIONS

International Search Report for PCT/CN2018/082909, dated Jul. 4, 2018.

* cited by examiner

DATA LIVE STREAMING METHOD, AND RELATED DEVICE AND SYSTEM

CROSS REFERENCE TO RELATED APPLICATIONS

This application is a continuation of International Patent Application No. PCT/CN2018/082909, filed Apr. 13, 2018, which claims priority from Chinese Patent Application No. 201710255354.4, filed with the China National Intellectual Property Administration (CNIPA) on Apr. 18, 2017, the disclosures of which are incorporated herein by reference in their entireties.

BACKGROUND

Field

Methods and apparatuses consistent with embodiments of the present application relate to communications, and in particular, to data live streaming.

Related Art

As computers and communications technologies continuously develop, improved streaming methods, such as live streaming, are needed. Electronic sports live streaming, centered on electronic sports content and based on a live streaming manner, has become a mainstream form of live streaming.

The electronic sports have many similarities with the traditional sports industry, are associated with the Internet, and therefore have massive viewers. In addition, many people prefer to view electronic sports games. The viewer groups of the electronic sports live streaming industry even span different ages. The electronic sports live streaming industry can also generate many sub-industries, and the scale is continuously increasing.

Currently, the electronic sports live streaming is mainly implemented by using screen recording and streaming technologies. Screen recording is performed, video data is coded, and the video data is broadcast by using a streaming server or a peer to peer (P2P) network.

However, encoded video data requires a relatively large bandwidth, and a user of a mobile terminal is limited by the network situation. For example, the user can view the live streaming in a state of Wireless Fidelity (Wi-Fi), but may not be able to view the live streaming in a state of a General Packet Radio Service (GPRS) network.

SUMMARY

One or more embodiments provide a data live streaming method, and a related device and system, to reduce bandwidth for data transmission in a live streaming process, save network traffic, and improve adaptability of live streaming to a network environment.

According to an aspect of an embodiment, there is provided A data live streaming method that is performed by at least one processor. The method includes: receiving, by the at least one processor, frame data from clients in a client set, wherein each client in the client set is synchronously running a target application; broadcasting, by the at least one processor, the frame data to each client in the client set to perform data exchange; and synchronously sending, by the at least one processor, the frame data to a mobile terminal, wherein the mobile terminal generates live streaming data corresponding to the target application according to the frame data and prestored data corresponding to the target application.

According to an aspect of an embodiment, there is provided a server. The server includes: at least one memory configured to store computer program code; and at least one processor configured to access the at least one memory and operate as instructed by the computer program code. The computer program code includes: first receiving code configured to cause the at least one processor to receive frame data from clients in a client set, wherein each client in the client set is synchronously running a target application; broadcasting code configured to cause the at least one processor to broadcast the frame data to each client in the client set to perform data exchange; and synchronous send code configured to cause the at least one processor to synchronously send the frame data to a mobile terminal, wherein the mobile terminal generates live streaming data corresponding to the target application according to the frame data and prestored data corresponding to the target application.

According to an aspect of an embodiment, there is provided one or more non-transitory storage mediums storing computer readable instructions. The computer readable instructions, when executed by one or more processors, cause the one or more processors to: receive frame data from clients in a client set, wherein each client in the client set is synchronously running a target application; broadcast the frame data to each client in the client set to perform data exchange; and synchronously send the frame data to a mobile terminal, wherein the mobile terminal generates live streaming data corresponding to the target application according to the frame data and prestored data corresponding to the target application.

BRIEF DESCRIPTION OF THE DRAWINGS

The above and other aspects, features and advantages will become apparent from the following detailed description taken in conjunction with the accompanying drawings in which.

DETAILED DESCRIPTION

One or more embodiments provide a data live streaming method, and a related device and system, to reduce bandwidth for data transmission in a live streaming process, save network traffic, and improve adaptability of live streaming to a network environment.

To better convey the present disclosure, embodiments will be further described in detail with reference to the accompanying drawings. It should be understood that, the specific implementations described herein are only used for interpreting this application, rather than limiting this application. All other embodiments obtained based on the embodiments of the present disclosure shall fall within the protection scope of the present application.

In the specification, claims, and accompanying drawings of the present disclosure, the terms "first", "second", "third", "fourth", and so on (if existing) are intended to distinguish between similar objects rather than describe a specific order or sequence. It should be understood that the data used in such a way is interchangeable in proper cases, so that the embodiments described herein can be implemented in other orders than the order illustrated or described herein. Moreover, the terms "include", "contain" and any other variants are intended to cover the non-exclusive inclusion. For example, a process, method, system, product, or device that includes a series of steps or units is not necessarily limited to those steps or units that are expressly listed, but may include other steps or units not expressly listed or inherent to such a process, method, product, or device.

Figure 1:
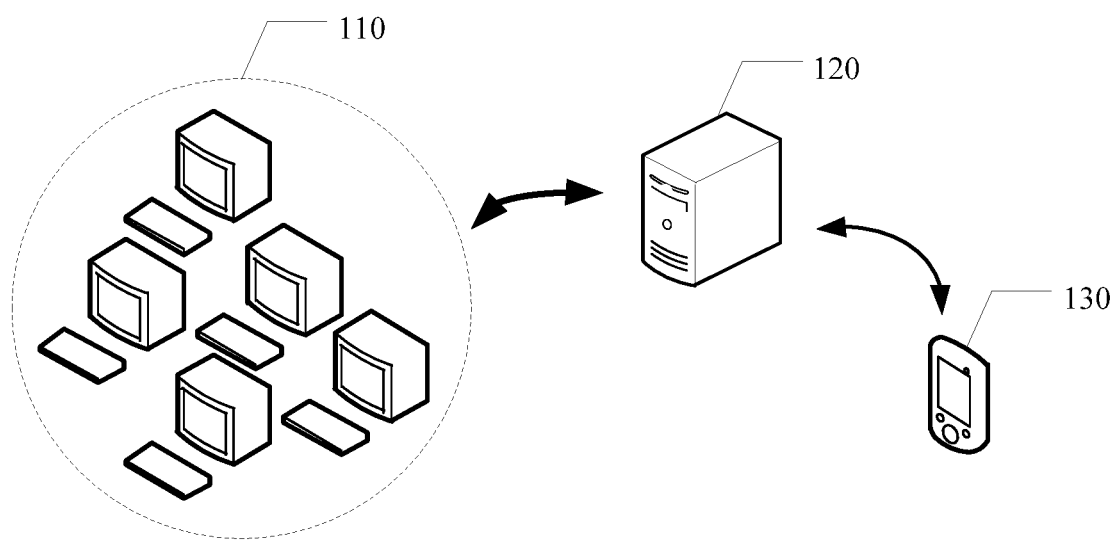
FIG. 1 is a schematic diagram of a data live streaming system according to an embodiment.

One or more embodiments provide a data live streaming method, and the data live streaming method may be applied to a data live streaming system. For understanding, refer to FIG. 1. FIG. 1 is a schematic diagram of the data live streaming system. The data live streaming system includes a client set 110, a server 120, and a mobile terminal 130. Each client in the client set 110 is configured to send frame data to the server, and the frame data is not video data, and may be understood as operation data that is received by the client in a time slice (for example, 40 ms) and that is entered by a player. By using a scenario as an example, the operation data may be data generated by an operation such as controlling a role to shoot at the basket, move, or dribble. Each client in the client set is a client synchronously running the target application; the server 120 is configured to: receive the frame data sent by each client in the client set, and broadcast the received frame data in a range of the client set, so that each client in the client set performs data exchange by using the server; in addition, the server 120 synchronously sends the frame data to the mobile terminal 130, and the mobile terminal 130 may generate, according to the frame data and prestored data corresponding to the target application, live streaming data of running of the target application. The mobile terminal 130 displays the live streaming data on a display screen.

It should be noted that functions of the server 120 may be implemented by using one server. In an actual application, the functions of the server may be separately implemented by several servers. In an actual application, a specific implementation form of the server is not limited in the present disclosure.

The system may be understood in the following scenario: An example in which the target application is a sports game "Strongest NBA" is used for description. For example, the client set may include ten clients, and each client synchronously runs the game. A player controls one role on each client, and there are ten roles in total in the game. The ten roles are grouped into two groups each with five roles, and the two groups play a sports match. This is similar to an actual basketball match. That is, the client in the client set is a sports end of the game. The server synchronously sends the received frame data of the client to the mobile terminal, the mobile terminal is configured to display live scores of the "Strongest NBA", and the mobile terminal already loads related data corresponding to the "Strongest NBA" in advance. For example, the related data includes data such as a scenario of the game, and a 3D role model and action. In this way, the mobile terminal may perform rendering according to the received frame data and the related data, to generate live streaming data of the "Strongest NBA". The user views the scores of the basketball match by using the mobile terminal. The mobile terminal may be a mobile phone, a tablet computer, personal digital assistant (PDA), or the like. In this embodiment, an example in which the mobile terminal may be the mobile phone is used for description.

Figure 2:
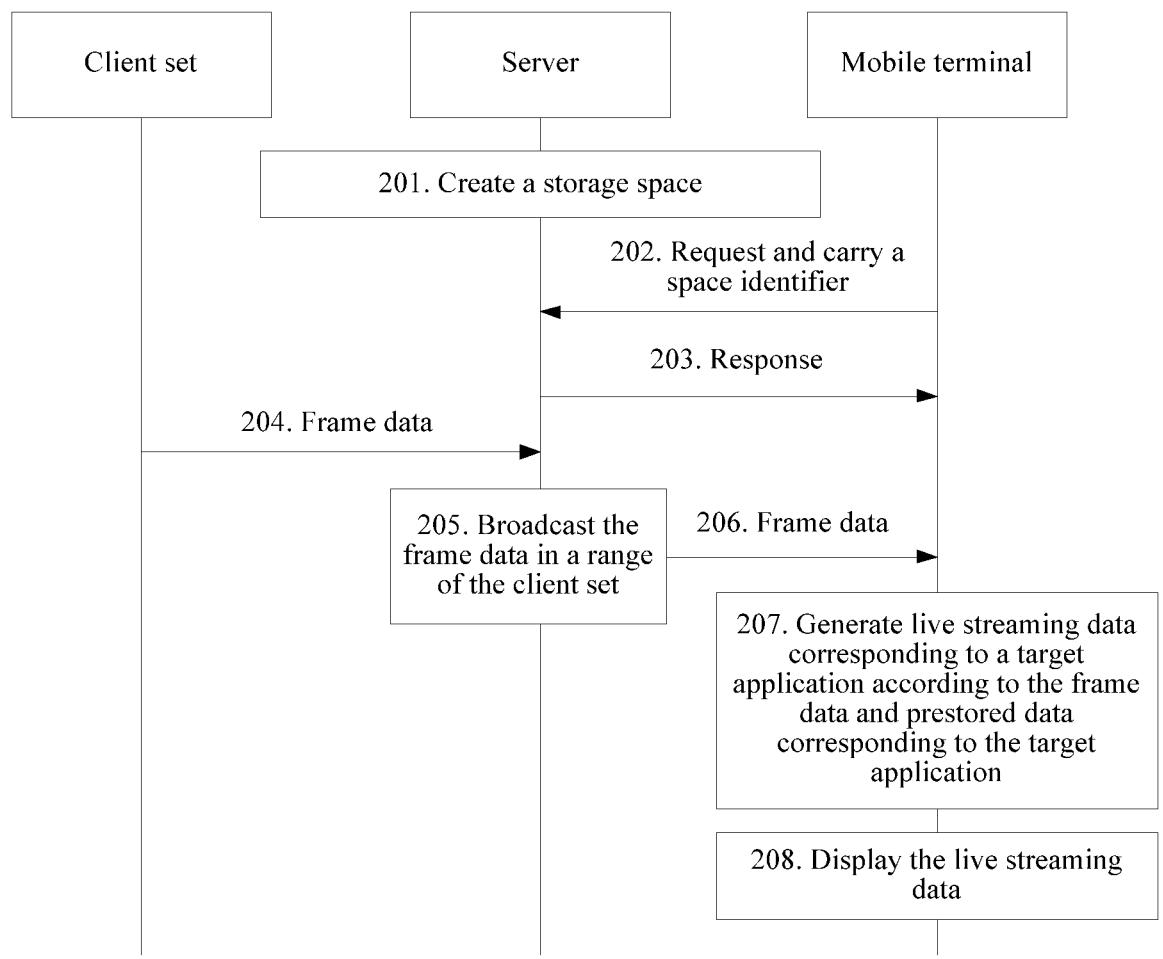
FIG. 2 is a schematic diagram illustrating steps of a data live streaming method according to an embodiment.

Referring to FIG. 2, a data live streaming method provided in an embodiment is described in detail in the following. An embodiment of the data live streaming method includes:

Step 201: A server creates a storage space, the storage space being used for storing frame data sent by each client in a client set, and the storage space having a space identifier.

The server creates the storage space, the storage space has the space identifier, and the space identifier is used for searching for and indexing the storage space. For example, the storage space may be understood as a live streaming room, the live streaming room has a corresponding space identifier, and the space identifier is used for searching for and indexing the live streaming room.

In an actual application, the server may create a plurality of storage spaces, and each storage space is a live streaming room. In addition, the server may create an identifier list of the storage spaces, and identifiers included in the identifier list have mapping relationships with the storage spaces. Because one live streaming room corresponds to one game, when the server broadcasts frame data in one live streaming room, each client in the client set can receive the frame data.

For example, the space identifier of the storage space may be a sequence number (for example, "5"), or may be content of live streaming (for example, "Strongest NBA"), or may be a combination of tags (for example, sports-basketball). In an actual application, a specific form is not limited.

Step 202. The mobile terminal sends, to the server, a request used for applying to obtain the frame data, the request including the space identifier.

The mobile terminal is a viewing end used by a user to view a match. The mobile terminal first needs to obtain permission to view the match. The mobile terminal sends a request to the server, and the server includes the space identifier (for example, "5"). In the following scenario, the user intends to view match live streaming of the "Strongest NBA", and finds on a live streaming platform that a live streaming room number of the game match is "5", then the terminal sends a request carrying the space identifier to the server, and the request is used for requesting to participate in viewing a live streaming match of the game.

Step 203: The server receives the request, and feeds back a response to the mobile terminal, the response being used for indicating that a correspondence is set up between the mobile terminal and the space identifier.

After receiving the request, the server feeds back a response to the mobile terminal, and sets up the correspondence between the space identifier and the mobile terminal, and the response is used for notifying the mobile terminal that the mobile terminal has the permission to view the match of the live streaming room.

Step 204: Each client in the client set sends the frame data to the server, each client in the client set being a client synchronously running a target application.

The frame data sent by each client in the client set to the server is not video data, and may be understood as operation data that is received by the client in a time slice (for example, 40 ms) and that is entered by a player. For example, the operation data is data generated by an operation such as controlling a role to shoot at the basket, move, or dribble.

Step 205. The server receives the frame data, and the server broadcasts the frame data in a range of the client set.

For example, the client set includes at least a first client and a second client, the first client receives a control instruction of a player A to control a role A, and the second client receives a control instruction of a player B to control a role B. When the server receives first frame data of the role A "shooting the basket" that is sent by the first client, and at the same time, the server receives second frame data of "moving leftwards" from the second client, the server broadcasts the first frame data and the second frame data in the range of the client set, so that ten clients in the client set can all receive the first frame data and the second frame data. Each client already loads related data corresponding to the game in advance, and the related data includes scenario data, 3D model data, and the like. Therefore, each client performs computation according to the received first frame data and second frame data, and the related data corresponding to the game, and then displays an action of each role on the client. That is, each client in the client set receives the frame data broadcast by the server, to perform data exchange.

Step 206. The server synchronously sends the frame data to the mobile terminal.

Each time the frame data sent by each client in the client set is received, the server synchronously sends the frame data to the mobile terminal. For example, when the server receives the first frame data of the role A shooting the basket and the second frame data of the role B moving leftwards, the server synchronously sends the first frame data and the second frame data to the mobile terminal.

Step 207. The mobile terminal receives the frame data sent by the server, and the mobile terminal generates live streaming data corresponding to the target application according to the frame data and prestored data corresponding to the target application.

The mobile terminal prestores related data corresponding to the game, and the related data includes scenario data, 3D model data, and the like of the game. For example, the mobile terminal performs computation according to the received first frame data and second frame data, and the related data of the game, to generate the live streaming data of the game.

It may be understood that in this embodiment, after receiving the frame data, the mobile terminal performs computation locally to provide synchronous animation images. This requires that all clients in all live streaming client sets have unified computation logic, to ensure that images displayed by all mobile terminals are the same.

Step 208. The terminal displays the live streaming data on a display screen.

It may be understood that the mobile terminal is used as a display end of the game match, and the mobile terminal displays the live streaming data, so that the user can view the live streaming data of the game by using the mobile terminal.

It should be noted that because the frame data is entered data, the mobile terminal needs to perform computation from the first frame when playing back the frame data. The server needs to buffer complete data of a latest section. For example, a basketball match is divided into different sections, and duration of each section may be approximately two minutes.

The mobile terminal may receive a control instruction of whether to fast-forward that is entered by the user. For example, the user participates in viewing the match when the live streaming reaches 20 s, but the mobile terminal starts playback since 0 s. The user may choose to fast-forward until the playback is completely synchronized with a current match progress. In another implementation, the mobile terminal still starts playback since 0 s. However, the mobile terminal can automatically jump to a current playback position (for example, a position of 20 s), to synchronize the playback with the current match progress.

In this embodiment, the method provided in this embodiment has significant advantages in game live streaming with a huge quantity of online users. In this solution, bandwidth required for supporting a live streaming activity with a million online users may be approximately 20,000 million bits per second (Mbps). If a common server with a gigabit network adapter is used, approximately 24 servers are needed (for example, traffic of each server is 800 Mbps, and each server can support approximately 40-50 thousand online users), but traffic of a user end is only 20 kbps. An example of "Strongest NBA" is used. Because bandwidth required by a single user is very low and does not put a high requirement on a mobile network, the bandwidth is applicable to various network environments. Even in a GPRS network, live streaming can be performed well. This greatly facilitates the user viewing electronic sports live streaming. For a live streaming party, server bandwidth and server costs can be greatly reduced. For example, a single server with the gigabit network adapter can support a live streaming activity with four million users online at the same time. A megabit-level live streaming service only needs a cluster of 30 servers.

Based on the foregoing embodiment, the mobile terminal displays the live streaming data, so that the user views the live streaming data. Optionally, the mobile terminal may further receive interaction information entered by the user, and the interaction information is information for interacting with the live streaming data currently played back by the mobile terminal. For example, the interaction information may be text information, for example, cheering words or comments. The interaction information may alternatively be a preset interaction scenario included in the related information of the game. The mobile terminal may receive a selection instruction entered by the user for the interaction scenario. The mobile terminal determines the interaction scenario according to the selection instruction. For example, the interaction scenario may be that the mobile terminal receives a control instruction entered by the user, to control actions of viewers of the match. For example, the interaction scenario may be "wave", "applauding", or "song: remember the name". The interaction information may be used to heighten the atmosphere.

The mobile terminal then sends the interaction information to the server. When receiving the interaction information, the server may verify the information. The server determines, through verification, whether the interaction information is interaction information satisfying a rule. For example, when the interaction information is text information, the server verifies whether key words of the text information include a word not satisfying the rule, to avoid entry of some text information of negative energy, or the like, so as to verify the interaction information. First, it may be determined that whether the interaction information is interaction information sent by a mobile terminal already authorized by the server. Then some information not satisfying the rule may be filtered out through verification, to ensure a clean network as much as possible, and enable the electronic sports live streaming to be a network activity that stimulates user enthusiasm and that is full of positive energy.

The server broadcasts, if the interaction information passes the verification, the interaction information in the range of the client set according to the space identifier associated with the mobile terminal. The client in the client set displays the interaction information, to cheer up a participant client and heighten the match atmosphere.

In this embodiment, the server receives the frame data sent by each client in the client set, and each client in the client set is the client synchronously running the target application. For example, each client in the client set may run a game, and receive operation data entered by the user during the game. The server broadcasts the frame data in the range of the client set, so that each client in the client set receives the frame data to perform data exchange, and the server sends the frame data to the mobile terminal. The mobile terminal may be understood as a device used by a viewing party of the electronic sports live streaming. The mobile terminal generates the live streaming data corresponding to the target application according to the frame data and the prestored data corresponding to the target application. In this embodiment, the mobile terminal receives operation frame data for the target application that is sent by the server, and then performs rendering according to the received frame data and the prestored data such as a 3D model of the game, to obtain the live streaming data. Therefore, bandwidth is much lower than traditional bandwidth occupied for receiving a video stream. The bandwidth for data transmission is greatly reduced, and is applicable to a current network environment of a mobile end, thereby saving network traffic, and improving adaptability to the network environment.

Figure 3:
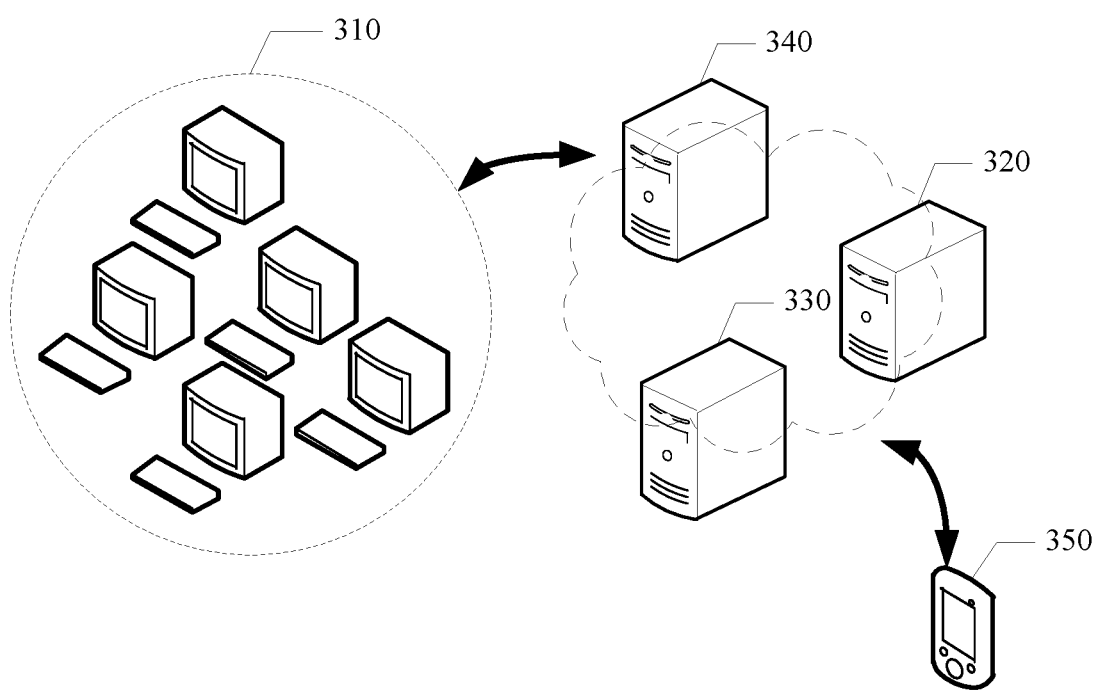
FIG. 3 is a schematic diagram of another embodiment of a data live streaming system according to an embodiment.

It should be noted that in the system architecture shown in the schematic diagram of the data live streaming system corresponding to FIG. 1, functions of the server may be performed by a frame synchronization server, a relay server, and a storage space server. An embodiment further provides another embodiment of a data live streaming system. For understanding, refer to FIG. 3. FIG. 3 is a schematic diagram of another embodiment of a data live streaming system. The data live streaming system includes a client set 310, a frame synchronization server 320, a relay server 330, a storage space server 340, and a mobile terminal 350.

Figure 4:
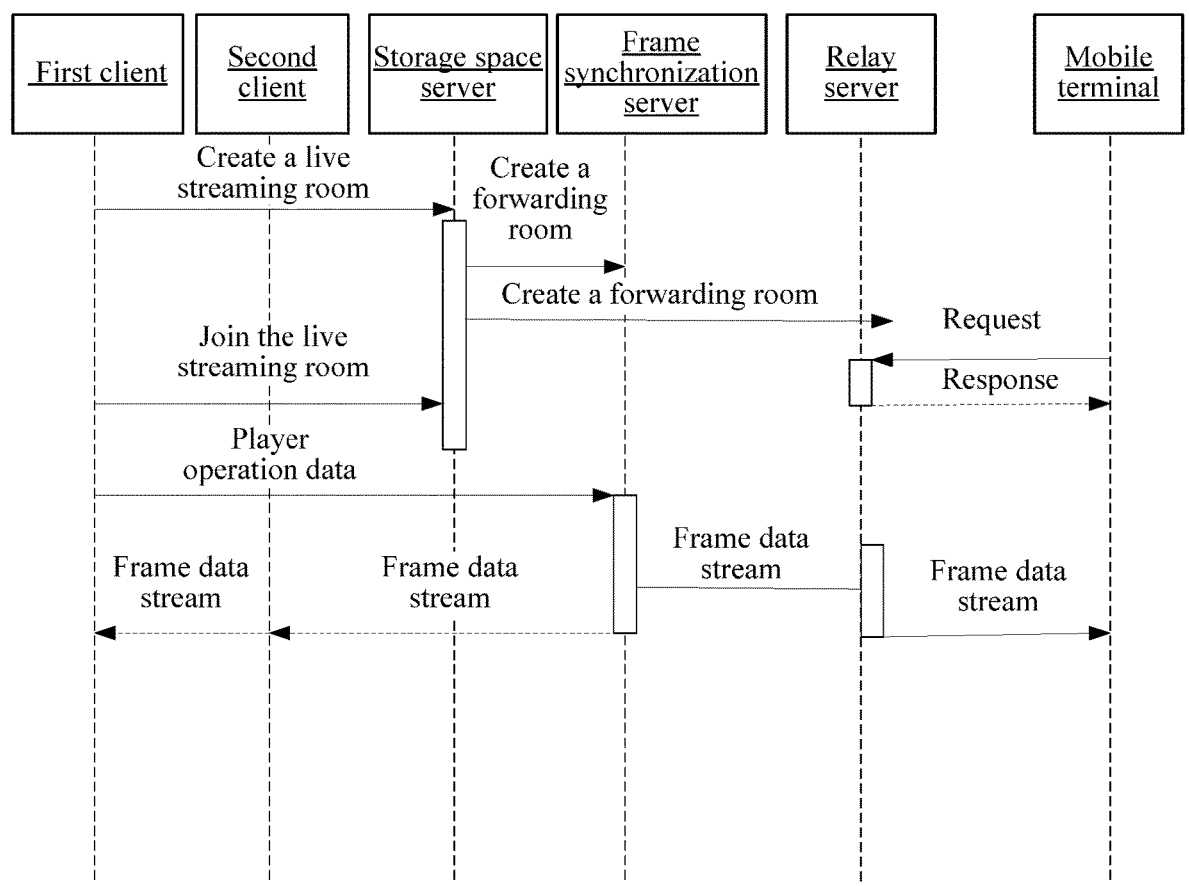
FIG. 4 is a schematic diagram of a time sequence in which devices in a system perform functions according to an embodiment.

For understanding, refer to FIG. 4. FIG. 4 is a schematic diagram of a time sequence in which the devices in the data live streaming system perform functions. The storage space server 340 creates a storage space, the storage space is used for storing frame data sent by each client in the client set, and the storage space has a space identifier. In an actual application, the storage space may be understood as a live streaming room, and the storage space server 340 creates a storage space on the frame synchronization server 320 and the relay server 330. An example in which the storage space is the live streaming room is used for description in the following.

The relay server 330 receives a request sent by the mobile terminal. It may be understood that the request is used for registering with the live streaming room, to obtain frame data of the live streaming room.

The storage space server 340 sets up a correspondence between the space identifier and the mobile terminal. The frame synchronization server 320 receives the frame data sent by each client in the client set, each client in the client set 310 is a client synchronously running a target application, and the client set is a set of clients that receive entered operation data.

Each client in the client set performs data exchange through frame data broadcast by the frame synchronization server; the frame synchronization server 320 broadcasts the frame data in a range of the client set, and synchronously sends the frame data to the relay server 330; the relay server 330 forwards the frame data to the mobile terminal 350, so that the mobile terminal 350 generates live streaming data corresponding to the target application according to the frame data and prestored data corresponding to the target application; and the mobile terminal 350 displays the live streaming data on a display screen. It should be noted that the relay server 330 may alternatively be a server cluster in an actual application.

In an application scenario, a client participating in a live streaming match creates a live streaming room on the storage space server. The storage space server synchronizes live streaming room data onto the frame synchronization server and the relay server.

The client participates in the match and generates frame data (for example, data of operations such as controlling a role to shoot the basket or move leftwards), and reports the frame data to the frame synchronization server. The frame synchronization server broadcasts the frame data in the live streaming room (frame data synchronization within a participant client set), and synchronizes the frame data onto the relay server.

A mobile terminal of a viewing party views a list of current matches by using the storage space server, and finds a corresponding live streaming room identifier. The mobile terminal then receives frame data corresponding to the live streaming room identifier that is sent by the relay server, and performs computation locally to reproduce an entire match process.

In this embodiment, only several servers are needed in a game live streaming process with a huge quantity of online users, thereby greatly reducing device and bandwidth costs of the server. For example, because the frame data is transmitted, a transmitted data amount is relatively small, buffer is almost not needed, and real-time quality of live streaming is also greatly improved.

Figure 5:
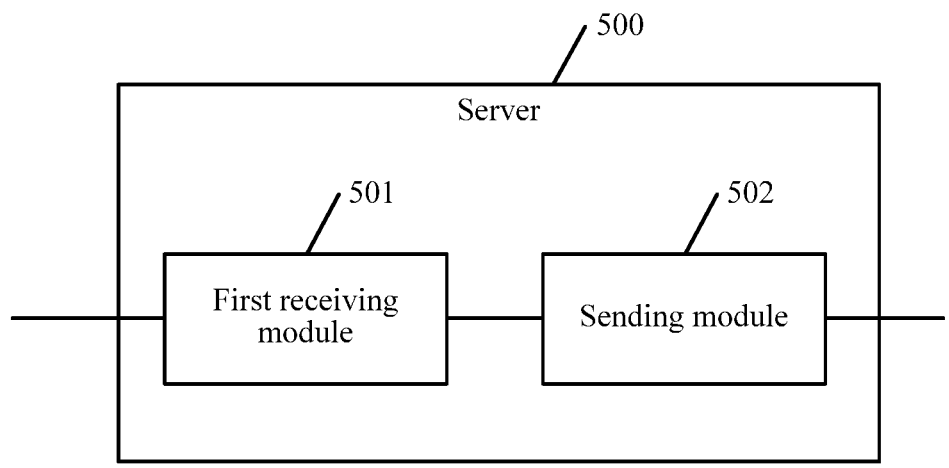
FIG. 5 is a schematic diagram of a server according to an embodiment.

The data live streaming method is described in the foregoing, and a server applied in the data live streaming method is described in the following. FIG. 5 shows an embodiment of a server according to an embodiment. The server includes:

a first receiving module 501, configured to: receive frame data sent by each client in a client set, each client in the client set being a client synchronously running a target application; and a sending module 502, configured to: broadcast, in a range of the client set, the frame data received by the first receiving module 501, and synchronously send the frame data to a mobile terminal, so that each client in the client set receives the frame data to perform data exchange, and the mobile terminal generates live streaming data corresponding to the target application according to the frame data and prestored data corresponding to the target application.

Figure 6:
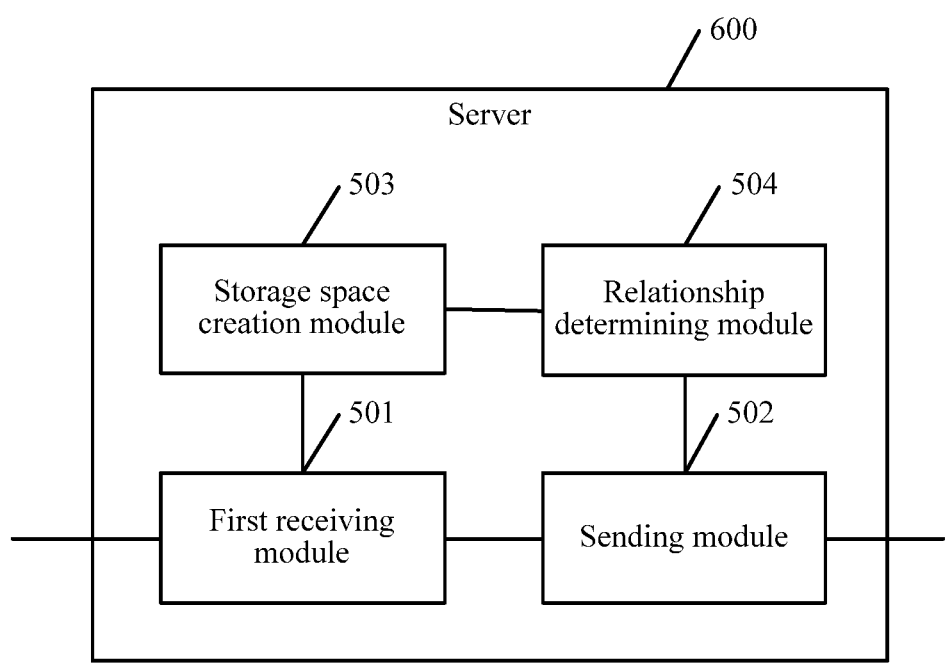
FIG. 6 is a schematic diagram of another embodiment of a server according to an embodiment.

Based on the embodiment corresponding to FIG. 5, referring to FIG. 6, an embodiment further provides another embodiment of a server 600. The server 600 further includes:

a storage space creation module 503 and a relationship determining module 504, the storage space creation module 503 being configured to create a storage space, the storage space being used for storing the frame data sent by each client in the client set, and the storage space having a space identifier; and the relationship determining module 504 being configured to set up a correspondence between the space identifier and the mobile terminal.

Figure 7:
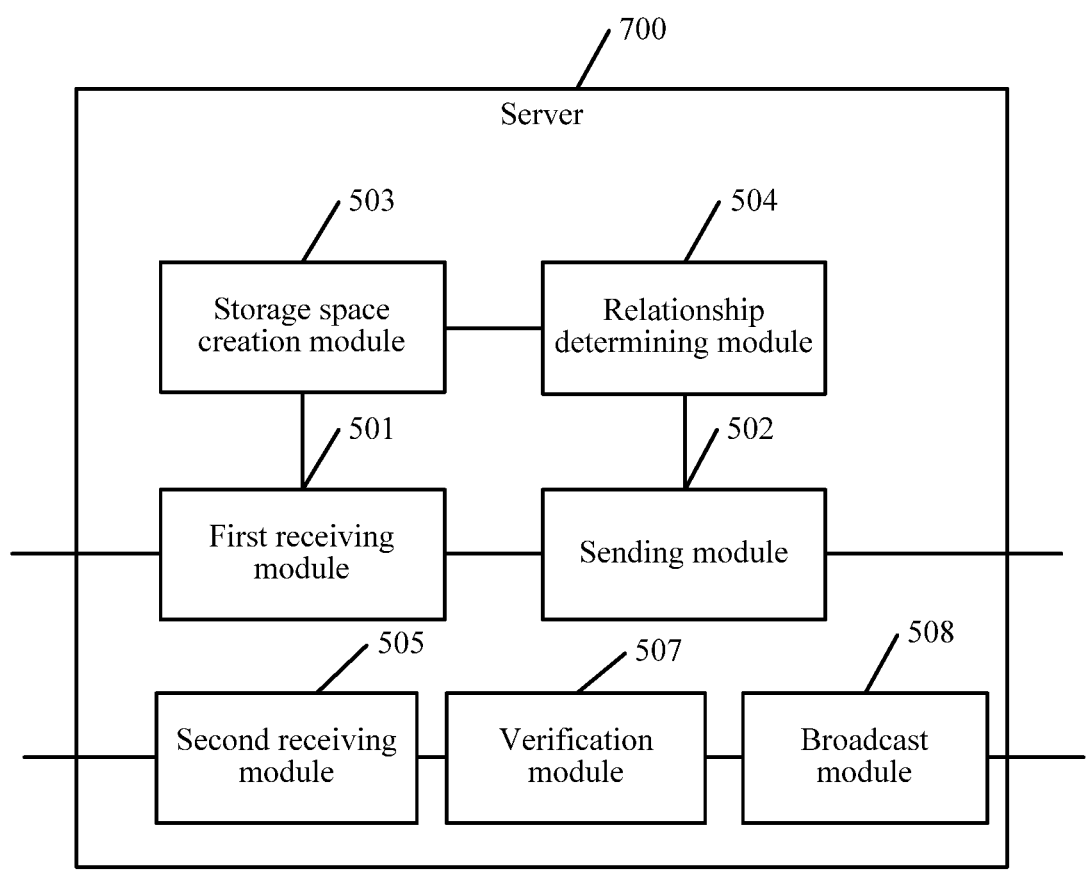
FIG. 7 is a schematic diagram of another embodiment of a server according to an embodiment.

Based on the embodiment corresponding to FIG. 6, referring to FIG. 7, an embodiment further provides another embodiment of a server 700. The server 700 further includes:

a second receiving module 505, a verification module 507, and a broadcast module 508, the second receiving module 505 being configured to receive interaction information sent by the mobile terminal;

the verification module 507 being configured to verify the interaction information received by the second receiving module 505; and the broadcast module 508 being configured to broadcast, if the interaction information passes the verification, the interaction information in the range of the client set according to the space identifier associated with the mobile terminal.

Further, the server in FIG. 5 to FIG. 7 is presented in a form of a function module. The "module" herein may refer to an application-specific integrated circuit (ASIC), a circuit, a processor performing one or more software or firmware programs, and a memory, an integrated logical circuit, and/or another device that can provide the foregoing functions. In at least one embodiment, the server in FIG. 5 to FIG. 7 may adopt a form shown in FIG. 8.

Figure 8:
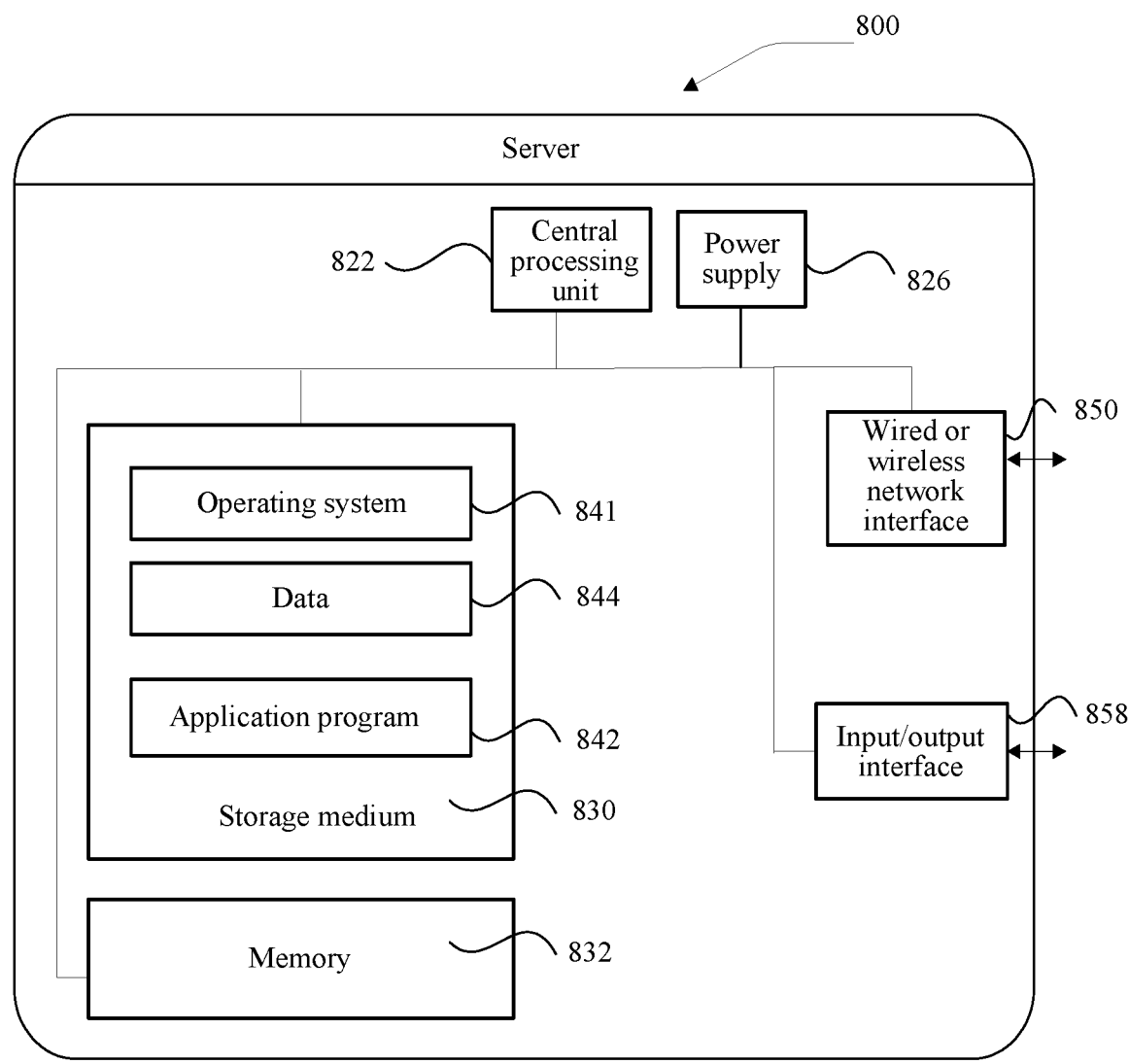
FIG. 8 is a schematic diagram of another embodiment of a server according to an embodiment.

FIG. 8 is a schematic diagram of a server according to an embodiment. The server 800 may vary greatly due to different configurations or performance, and may include one or more central processing units (CPU) 822 (for example, one or more processors) and a memory 832, and one or more storage mediums 830 (for example, one or more mass storage devices) that store an application program 842 or data 844. The memory 832 and the storage medium 830 may be transient storages or persistent storages. The program stored in the storage medium 830 may include one or more modules, and each module may include a series of instruction and operations to the server. Still further, the CPU 822 may be configured to communicate with the storage medium 830, and perform, on the server 800, a series of instructions and operations in the storage medium 830.

The server 800 may further include one or more power supplies 826, one or more wired or wireless network interfaces 850, one or more input/output interfaces 858, and/or one or more operating systems 841, for example, Windows Server™, Mac OS X™, Unix™, Linux™, or FreeBSD™.

The CPU in the foregoing embodiment enables the server to perform the following data live streaming method:

receiving frame data sent by each client in a client set, each client in the client set being a client synchronously running a target application; and broadcasting the frame data in a range of the client set, and synchronously sending the frame data to a mobile terminal, so that each client in the client set receives the frame data to perform data exchange, and the mobile terminal generates live streaming data corresponding to the target application according to the frame data and prestored data corresponding to the target application.

In a possible implementation, before sending the frame data to a mobile terminal, the method further includes:

creating a storage space, the storage space being used for storing the frame data sent by each client in the client set, and the storage space having a space identifier; and setting up a correspondence between the space identifier and the mobile terminal.

In a possible implementation, the method further includes:

receiving interaction information sent by the mobile terminal;

verifying the interaction information; and broadcasting, if the interaction information passes the verification, the interaction information in the range of the client set according to the space identifier associated with the mobile terminal.

Figure 9:
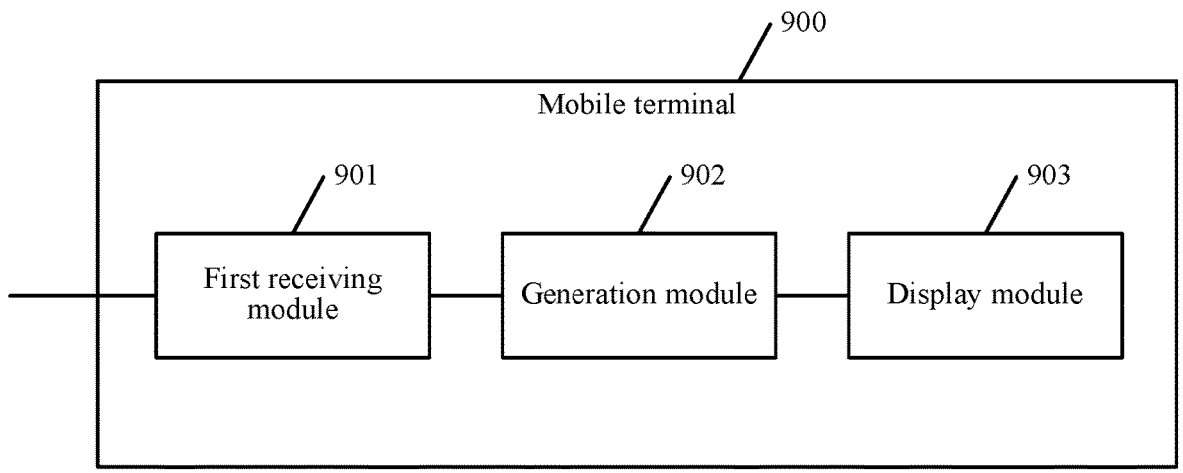
FIG. 9 is a schematic diagram of a mobile terminal according to an embodiment.

Referring to FIG. 9, an embodiment further provides a mobile terminal 900. The mobile terminal 900 includes:

a first receiving module 901, configured to receive frame data sent by a server, the frame data including frame data sent by each client in a client set to the server, and each client in the client set being a client synchronously running a target application;

a generation module 902, configured to generate live streaming data corresponding to the target application according to the frame data received by the first receiving module 901 and prestored data corresponding to the target application; and a display module 903, configured to display the live streaming data.

Figure 10:
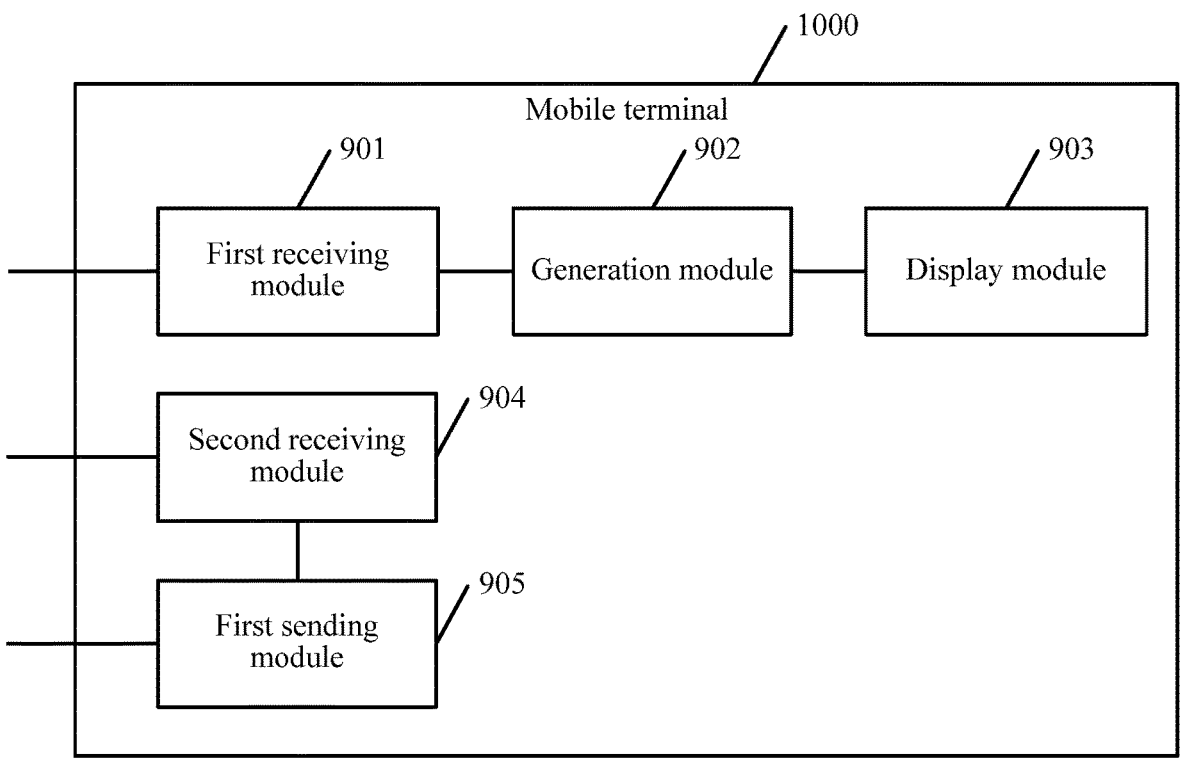
FIG. 10 is a schematic diagram of another embodiment of a mobile terminal according to an embodiment.

Based on the embodiment corresponding to FIG. 9, referring to FIG. 10, an embodiment further provides another embodiment of a mobile terminal 1000. The mobile terminal 1000 further includes:

a first sending module 905 and a second receiving module 904, the first sending module 905 being configured to send, to the server, a request used for applying to obtain the frame data, the frame data being stored in a storage space created by the server, and the storage space having a corresponding space identifier; and the second receiving module 904 being configured to receive a response fed back by the server, the response including the space identifier, and the space identifier being used for indicating that the server sets up a correspondence between the mobile terminal and the space identifier.

Figure 11:
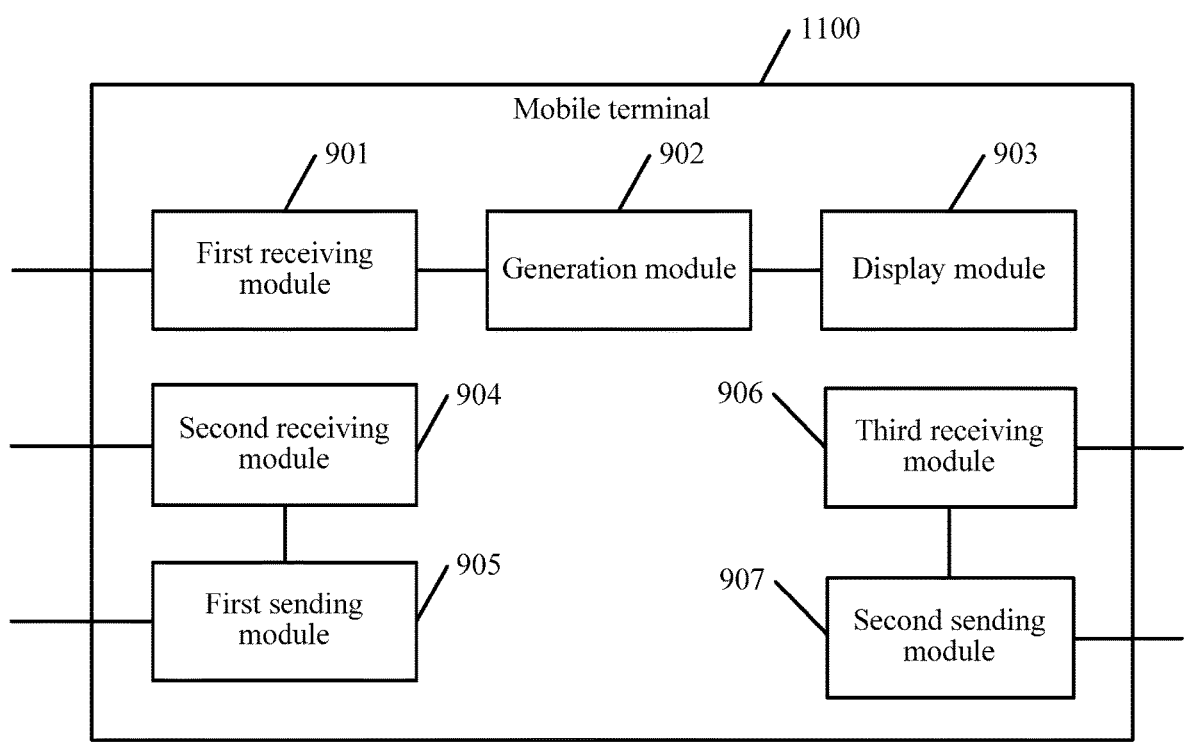
FIG. 11 is a schematic diagram of another embodiment of a mobile terminal according to an embodiment.

Based on the embodiment corresponding to FIG. 10, referring to FIG. 11, an embodiment further provides another embodiment of a mobile terminal 1100. The mobile terminal 1100 further includes:

a third receiving module 906 and a second sending module 907, the third receiving module 906 being configured to receive interaction information entered by a user; and the second sending module 907 being configured to send the interaction information received by the third receiving module 906 to the server, so that the server broadcasts the interaction information in a range of the client set according to the space identifier.

Further, the mobile terminal in FIG. 9 to FIG. 11 is presented in a form of a function module. The "module" herein may refer to an ASIC, a circuit, a processor performing one or more software or firmware programs, and a memory, an integrated logical circuit, and/or another device that can provide the foregoing functions. In a simple embodiment, the mobile terminal in FIG. 9 to FIG. 11 may adopt a form shown in FIG. 12.

Figure 12:
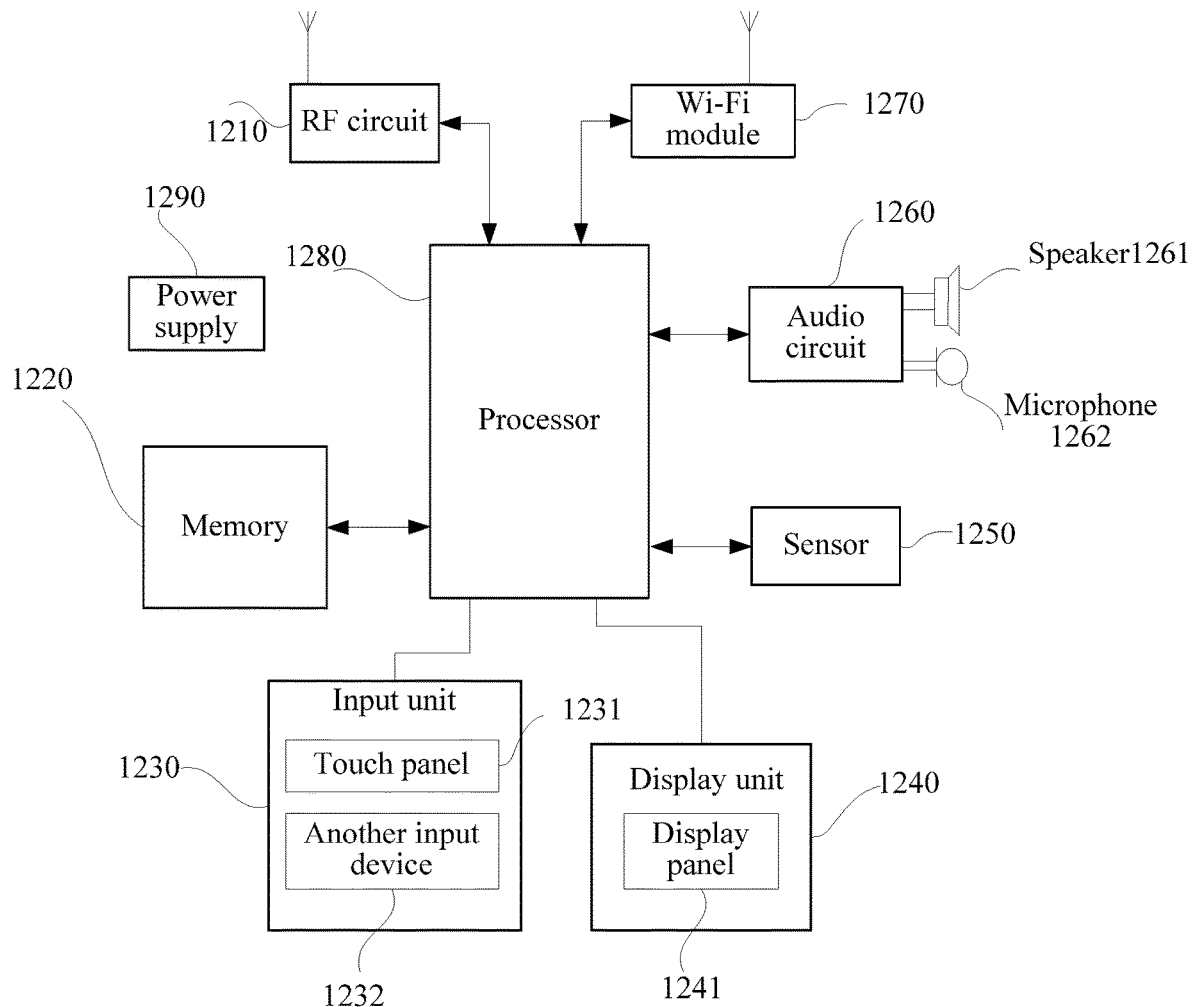
FIG. 12 is a schematic diagram of another embodiment of a mobile terminal according to an embodiment.

As shown in FIG. 12, for ease of description, only parts related to the embodiments are shown. For specific technical details that are not disclosed, refer to the method part in the embodiments. The terminal may be any terminal device including a mobile phone, a tablet computer, a PDA, a Point of Sales (POS), and an in-vehicle computer. An example in which the terminal is a mobile phone is used.

FIG. 12 is a block diagram of a part of structure of a terminal related mobile phone according to an embodiment. Referring to FIG. 12, the mobile phone includes components such as a radio frequency (RF) circuit 1210, a memory 1220, an input unit 1230, a display unit 1240, a sensor 1250, an audio circuit 1260, a Wi-Fi module 1270, a processor 1280, and a power supply 1290. Persons skilled in the art may understand that the structure of the mobile phone shown in FIG. 12 does not constitute a limitation to the mobile phone, and the mobile phone may include more or fewer components than those shown in the figure, or some components may be combined, or a different component deployment may be used.

The following specifically describes the components of the mobile phone with reference to FIG. 12.

The RF circuit 1210 may be configured to receive and send signals during an information receiving and sending process or a call process. Specifically, the RF circuit 1210 receives downlink information from a base station, then delivers the downlink information to the processor 1280 for processing, and sends related uplink data to the base station. Generally, the RF circuit 1210 includes, but is not limited to, an antenna, at least one amplifier, a transceiver, a coupler, a low noise amplifier (LNA), and a duplexer. In addition, the RF circuit 1210 may also communicate with a network and another device through wireless communication. The wireless communication may use any communications standard or protocol, which includes, but is not limited to, Global System for Mobile communications (GSM), GPRS, Code Division Multiple Access (CDMA), Wideband Code Division Multiple Access (WCDMA), Long Term Evolution (LTE), email, Short Messaging Service (SMS), and the like.

The memory 1220 may be configured to store a software program and a module. The processor 1280 runs the software program and the module stored in the memory 1220, to execute various function applications and data processing of the mobile phone. The memory 1220 may mainly include a program storage area and a data storage area. The program storage area may store an operating system, an application program required by at least one function (such as a sound playback function and an image playback function), and the like. The data storage area may store data (such as audio data and a phone book) created according to use of the mobile phone. In addition, the memory 1220 may include a high-speed random access memory, and may further include a non-volatile memory such as at least one magnetic disk storage device, a flash memory device, or another volatile solid storage device.

The input unit 1230 may be configured to receive input digit or character information, and generate a keyboard signal input related to the user setting and function control of the mobile phone. Specifically, the input unit 1230 may include a touch panel 1231 and another input device 1232. The touch panel 1231 may also be referred to as a touchscreen, and may collect a touch operation of a user on or near the touch panel (such as an operation of a user on or near the touch panel 1231 by using any suitable object or accessory such as a finger or a stylus), and drive a corresponding connection apparatus according to a preset program. Optionally, the touch panel 1231 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, identifies touch point coordinates based on the touch signal, and sends the touch point coordinates to the processor 1280. Moreover, the touch controller can receive and execute a command sent from the processor 1280. In addition, the touch panel 1231 may be a resistive, capacitive, infrared, or surface sound wave type touch panel. In addition to the touch panel 1231, the input unit 1230 may further include the another input device 1232. Specifically, the another input device 1232 may include, but is not limited to, one or more of a physical keyboard, a functional key (such as a volume control key or a switch key), a track ball, a mouse, and a joystick.

The display unit 1240 may be configured to display information input by a user or information provided for a user and various menus of the mobile phone. The display unit 1240 may include a display panel 1241. Optionally, the display panel 1241 may be configured by using a liquid crystal display (LCD), an organic light-emitting diode (OLED), and the like. Further, the touch panel 1231 may cover the display panel 1241. After detecting a touch operation on or near the touch panel 1231, the touch panel 1231 transfers the touch operation to the processor 1280, to determine a type of a touch event. Then, the processor 1280 provides a corresponding visual output on the display panel 1241 according to the type of the touch event. Although in FIG. 12, the touch panel 1231 and the display panel 1241 are used as two separate parts to implement input and output functions of the mobile phone, in some embodiments, the touch panel 1231 and the display panel 1241 may be integrated to implement the input and output functions of the mobile phone.

The mobile phone may further include at least one sensor 1250 such as an optical sensor, a motion sensor, and other sensors. Specifically, the optical sensor may include an ambient light sensor and a proximity sensor. The ambient light sensor may adjust luminance of the display panel 1241 according to brightness of the ambient light. The proximity sensor may switch off the display panel 1241 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1260, a speaker 1261, and a microphone 1262 may provide audio interfaces between the user and the mobile phone. The audio circuit 1260 may convert received audio data into an electric signal and transmit the electric signal to the speaker 1261. The speaker 1261 converts the electric signal into a sound signal for output. On the other hand, the microphone 1262 converts a collected sound signal into an electric signal. The audio circuit 1260 receives the electric signal and converts the electric signal into audio data, and outputs the audio data to the processor 1280 for processing. Then, the processor 1280 sends the audio data to, for example, another mobile phone by using the RF circuit 1210, or outputs the audio data to the memory 1220 for further processing.

Wi-Fi is a short distance wireless transmission technology. The mobile phone may help, by using the Wi-Fi module 1270, the user to receive and send emails, browse a web page, access streaming media, and so on, which provides wireless broadband Internet access for the user. Although FIG. 12 shows the Wi-Fi module 1270, it may be understood that the Wi-Fi module 1270 is not a necessary component of the mobile phone, and when required, the Wi-Fi module 1270 may be omitted as long as the scope of the essence of the present disclosure is not changed.

The processor 1280 is the control center of the mobile phone, and is connected to various parts of the mobile phone by using various interfaces and lines. By running or executing the software program and/or the module stored in the memory 1220, and invoking data stored in the memory 1220, the processor 1280 performs various functions and data processing of the mobile phone, thereby performing overall monitoring on the mobile phone. Optionally, the processor 1280 may include one or more processing units. Preferably, the processor 1280 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1280.

The mobile phone further includes the power supply 1290 (such as a battery) for supplying power to the components. Preferably, the power supply may be logically connected to the processor 1280 by using a power management system, thereby implementing functions such as charging, discharging and power consumption management by using the power management system.

Although not shown in the figure, the mobile phone may further include a camera, a Bluetooth module, and the like, which are not further described herein.

In this embodiment, the processor 1280 included in the terminal is further configured to enable the mobile terminal to perform the following data live streaming method:

receiving frame data sent by a server, the frame data including frame data sent by each client in a client set to the server, and each client in the client set being a client synchronously running a target application;

generating live streaming data corresponding to the target application according to the frame data and prestored data corresponding to the target application; and displaying the live streaming data on a display screen.

In a possible implementation, the method further includes:

sending, to the server, a request used for applying to obtain the frame data, the request including a space identifier, the frame data being stored in a storage space created by the server, and the storage space having the corresponding space identifier; and receiving a response fed back by the server, the response being used for indicating that the server sets up a correspondence between the mobile terminal and the space identifier.

In a possible implementation, the method further includes:

receiving interaction information entered by a user; and sending the interaction information to the server, so that the server broadcasts the interaction information in a range of the client set according to the space identifier.

Figure 13:
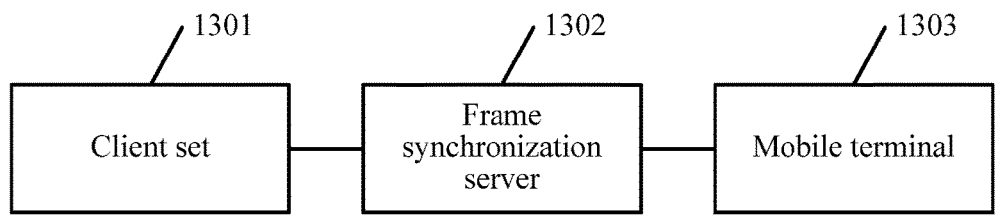
FIG. 13 is a schematic diagram of a data live streaming system according to an embodiment.

Referring to FIG. 13, an embodiment further provides a data live streaming system. The system may include:

a client set 1301, a frame synchronization server 1302, and a mobile terminal 1303, the frame synchronization server 1302 being configured to: receive frame data sent by each client in the client set, and broadcast the frame data in a range of the client set, each client in the client set being a client synchronously running a target application;

each client in the client set 1301 being configured to receive the frame data sent by the frame synchronization server to perform data exchange;

the frame synchronization server 1302 being further configured to synchronously send the frame data to the mobile terminal;

the mobile terminal 1303 being configured to: generate live streaming data corresponding to the target application according to the frame data and prestored data corresponding to the target application, and display the live streaming data on a display screen.

In some possible implementations, the system further includes a relay server, the frame synchronization server forwarding the frame data to the mobile terminal by using the relay server.

In some possible implementations, the system further includes a storage space server, the storage space server being configured to: create a storage space, the storage space being used for storing the frame data sent by each client in the client set, and the storage space having a space identifier; and set up a correspondence between the space identifier and the mobile terminal.

It may be clearly understood by persons skilled in the art that for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some of or all of the units may be selected according to actual needs to achieve the objectives of the solutions of the embodiments.

At least one of the components, elements, modules or units represented by a block as illustrated in FIGS. 5-13 may be embodied as various numbers of hardware, software and/or firmware structures that execute respective functions described above, according to an embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, communication between the components, elements, modules or units may be performed through a bus. Functional aspects of the above embodiments may be implemented in algorithms that execute on one or more processors. Furthermore, the components, elements, modules or units represented by a block or processing steps may employ any number of related art techniques for electronics configuration, signal processing and/or control, data processing and the like.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be personal computer, a server, a network device, or the like) to perform all or some of the steps of the methods described in the embodiments. The foregoing storage medium includes: any medium that can store program code, and may be non-transitory, such as a USB flash memory drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A data live streaming method, performed by at least one processor, comprising:
receiving, by the at least one processor, frame data from clients in a client set, wherein each client in the client set is synchronously running a target application;
broadcasting, by the at least one processor, the frame data to each client in the client set to perform data exchange; and
synchronously sending, by the at least one processor, the frame data to a mobile terminal, wherein the mobile terminal generates live streaming data corresponding to the target application according to the frame data and prestored data corresponding to the target application,
wherein the frame data comprises operation data that indicates a player movement command.

2. The data live streaming method according to claim 1, wherein before the sending the frame data to the mobile terminal, the method further comprises:
creating, by the at least one processor, a storage space for storing the frame data received from each client in the client set, the storage space having a space identifier; and
setting up, by the at least one processor, a correspondence between the space identifier and the mobile terminal.

3. The data live streaming method according to claim 2, the method further comprising:
receiving, by the at least one processor, interaction information from the mobile terminal;
verifying, by the at least one processor, the interaction information; and
broadcasting, by the at least one processor, the interaction information to the client set according to the space identifier associated with the mobile terminal based on the interaction information passing the verification.

4. The data live streaming method according to claim 3, wherein the verifying the interaction information comprises identifying whether the interaction information satisfies a rule, and
wherein the interaction information indicates at least one from among applause, wave and a command to remember a song.

5. The data live streaming method according to claim 3, wherein the interaction information indicates at least one from among applause, wave and a command to remember a song.

6. The data live streaming method according to claim 1, wherein the mobile terminal is one from among a plurality of mobile terminals, and
wherein the frame data is synchronously sent to each of the plurality of mobile terminals.

7. A server, comprising:
at least one memory configured to store computer program code; and
at least one processor configured to access the at least one memory and operate as instructed by the computer program code, the computer program code including:
first receiving code configured to cause the at least one processor to receive frame data from clients in a client set, wherein each client in the client set is synchronously running a target application;
broadcasting code configured to cause the at least one processor to broadcast the frame data to each client in the client set to perform data exchange; and
synchronous send code configured to cause the at least one processor to synchronously send the frame data to a mobile terminal, wherein the mobile terminal generates live streaming data corresponding to the target application according to the frame data and prestored data corresponding to the target application, wherein the frame data comprises operation data that indicates a player movement command.

8. The server according to claim 7, wherein the computer program code further comprises:

storage space creation code configured to cause the at least one processor to create a storage space for storing the frame data received from each client in the client set, the storage space having a space identifier; and relationship determining code configured to cause the at least one processor to set up a correspondence between the space identifier and the mobile terminal.

9. The server according to claim 8, wherein the computer program code further comprises:

second receiving code configured to cause the at least one processor to receive interaction information from the mobile terminal;

verification code configured to cause the at least one processor to verify the interaction information received by the server; and broadcast code configured to cause the at least one processor to broadcast, the interaction information to the client set according to the space identifier associated with the mobile terminal based on the verification code identifying that the interaction information has passed the verification.

10. The server according to claim 9, wherein the verifying the interaction information comprises identifying whether the interaction information satisfies a rule.

11. The server according to claim 10, wherein the interaction information indicates at least one from among applause, wave and a command to remember a song.

12. The server according to claim 7, wherein the mobile terminal is one from among a plurality of mobile terminals, and the synchronous send code is further configured to cause the at least one processor to synchronously send the frame data to each of the plurality of mobile terminals.

13. One or more non-transitory storage mediums storing computer readable instructions, the computer readable instructions, when executed by one or more processors, causing the one or more processors to:

receive frame data from clients in a client set, wherein each client in the client set is synchronously running a target application;

broadcast the frame data to each client in the client set to perform data exchange; and synchronously send the frame data to a mobile terminal, wherein the mobile terminal generates live streaming data corresponding to the target application according to the frame data and prestored data corresponding to the target application, wherein the frame data comprises operation data that indicates a player movement command.

14. The one or more non-transitory storage mediums according to claim 13 wherein the computer readable instructions further cause the one or more processors to:

create a storage space for storing the frame data received from each client in the client set, the storage space having a space identifier; and set up a correspondence between the space identifier and the mobile terminal.

15. The one or more non-transitory storage mediums according to claim 14 wherein the computer readable instructions further cause the one or more processors to:

receive interaction information from the mobile terminal;

verify the interaction information; and broadcast the interaction information to the client set according to the space identifier associated with the mobile terminal based on the interaction information passing the verification.

16. The one or more non-transitory storage mediums according to claim 15, wherein the interaction information is verified by identifying whether the interaction information satisfies a rule.

17. The one or more non-transitory storage mediums according to claim 16, wherein the interaction information indicates at least one from among applause, wave and a command to remember a song.

* * * * *